United States Patent [19]

Heim et al.

[11] Patent Number: 5,735,450
[45] Date of Patent: Apr. 7, 1998

[54] APPARATUS AND METHOD FOR HEATING A BOARD-MOUNTED ELECTRICAL MODULE FOR REWORK

[75] Inventors: Craig Grant Heim, Kirkwood; Christian Robert Le Coz, Endicott, both of N.Y.; Russell H. Lewis, Ft. Collins, Colo.

[73] Assignee: International Business Machines Corporation, Armonk, N.Y.

[21] Appl. No.: 669,902

[22] Filed: Jun. 21, 1996

[51] Int. Cl.$^6$ .......................... B23K 1/012; B23K 1/018
[52] U.S. Cl. .................. 228/191; 228/230; 228/232; 228/20.1
[58] Field of Search .................. 228/191, 232, 228/264, 20.1, 6.2, 230

[56] References Cited

U.S. PATENT DOCUMENTS

| | | | |
|---|---|---|---|
| 3,289,046 | 11/1966 | Carr | 361/772 |
| 4,160,893 | 7/1979 | Meyen et al. | 219/85 BA |
| 4,426,571 | 1/1984 | Beck | 219/373 |
| 4,552,300 | 11/1985 | Zovko et al. | 228/20 |
| 4,561,006 | 12/1985 | Currie | 357/28 |
| 4,752,025 | 6/1988 | Stach et al. | 228/191 |
| 4,767,047 | 8/1988 | Todd et al. | 228/6.2 |
| 4,787,548 | 11/1988 | Abbagnaro et al. | 228/6.2 |
| 4,805,827 | 2/1989 | Coffman et al. | 228/20 |
| 5,154,793 | 10/1992 | Wojnarowski et al. | 156/344 |
| 5,222,649 | 6/1993 | Funari et al. | 228/20.1 |
| 5,402,563 | 4/1995 | Satoh et al. | 29/829 |
| 5,419,481 | 5/1995 | Lasto et al. | 228/191 |
| 5,560,531 | 10/1996 | Ruszowski | 228/191 |

FOREIGN PATENT DOCUMENTS

| | | |
|---|---|---|
| 63-318133 | 12/1988 | Japan . |
| 1-17439 | 1/1989 | Japan . |
| 2-18990 | 1/1990 | Japan . |
| 2186514 | 8/1987 | United Kingdom .................. 228/20.1 |

OTHER PUBLICATIONS

"Non-Destructive Semiconductor Chip Bonding and Chip Removal," Murdoch, Francis J., United States Statutory Invention Registration No. H629, published Apr.4, 1989.

*Primary Examiner*—P. Austin Bradley
*Assistant Examiner*—Jeffrey T. Knapp
*Attorney, Agent, or Firm*—Jenkens & Gilchrist, P.C.; David L. Adour, Esq.

[57] ABSTRACT

An apparatus for heating a module mounted on a card includes a heating chamber adapted to receive the card and module, a nozzle adapted to surround the module and provide a flow of heated gas thereover, and a heated support surface for heating a bottom surface of a card immediately underlying the module. The method of removing and replacing a module on a card includes preheating the card and module prior to heating the contact sites to a solder reflow temperature and also preheating a card and a replacement module to an equilibrium temperature prior to increasing the temperature of the contact sites to the reflow temperature. The apparatus and method embodying the present invention effectively addresses the problem of providing a faster heating cycle, and a more even temperature distribution across the contact sites of the module and card.

12 Claims, 4 Drawing Sheets

APPARATUS AND METHOD FOR HEATING A BOARD-MOUNTED ELECTRICAL MODULE FOR REWORK

BACKGROUND OF THE INVENTION

1. Technical Field

This invention relates generally to an apparatus and method for heating an electronic module to a temperature sufficient to reflow the solder joints interconnecting the module with a circuit board, and more particularly, to such an apparatus and method wherein a substantially identical heat cycle is used to reattach a validated module to the circuit board.

2. Background Art

It is often necessary to rework board-mounted electronic modules, such as Ceramic Ball Grid Array packages (CBGA), Ceramic Column Grid Array packages (CCGA), Plastic Ball Grid Array packages (PBGA), or other Surface Mount Technology (SMT) components or Quad Flat Packs (QFP), if the components or an interconnection with the board is faulty. A common problem with removing and replacing such components is the difficulty in uniformly and simultaneously bringing all of the interconnection sites to a temperature sufficient to reflow the solder joints without damaging the component or adversely affecting the solder joint itself.

A number of attempts have been directed toward the solution of this problem. For example, U.S. Pat. No. 5,402,563, issued Apr. 4, 1995 to Satoh et al. discloses an apparatus suitable for the removal of an electronic component from a printed circuit board, and includes a hot gas top-side heating system, coupled with a second bottom-side lower heating device, and a device for withdrawing a chip disposed on the main surface of the printed circuit board.

In a similar manner, Japanese patent 63-318133 assigned to Hitachi, discloses a dual heat source, both of which heat the top of a chip and includes a block heater coupled to a gas heater to reflow solder. A portable air tool for solder reflow in a printed circuit board is disclosed in U.S. Pat. No. 4,426,571 issued Jan. 17, 1984 to Ronald A. Beck. The Beck device has dual gas nozzles comprising upper and lower nozzles, both of which are equipped with heaters and associated blowers.

U.S. Pat. No. 4,160,893 issued Jul. 10, 1979 to Meyer et al and assigned to International Business Machines Corporation, the assignee of the present invention, discloses a chip joining machine having a heater unit and a chip removal probe which is capable of heating the chip and reflowing the solder. None of the above described devices are satisfactorily capable of providing a uniform temperature distribution whereby all the solder joints on a relatively large module can be simultaneously heated to the reflow temperature of the solder.

The present invention is directed to overcoming the problems set forth above. It is desirable to have an apparatus that enables fairly large modules, i.e., greater than 32 mm, and thick, fully populated substrates, i.e. a thickness greater than about 0.080 in (2.0 mm), to be uniformly heated. It is also desirable to have such an apparatus and a method for reworking component assemblies that provides a shortened heating cycle whereby the removal and replacement of faulty modules can be accomplished in less time, and with more uniform control than provided by the use of previous apparatus and methods. Furthermore, it is desirable to have such an apparatus and method that provides improved rework quality at a lower cost than possible using current devices and methods.

SUMMARY OF THE INVENTION

In accordance with one aspect of the present invention, an apparatus for heating an electronic module attached to a substrate, such as a circuit board or card, includes a preheater having a cover and an inlet port connectable with a source of heated gas. A movable support member is disposed within the preheater and a heating element is positioned on the support member. A thermally conductive plate is disposed on the heating element and is adapted to support a preselected portion of the circuit board. The apparatus also includes a nozzle that is adapted to contact the wiring surface of the card at a position surrounding the module. The nozzle is connectable with a source of heated gas.

Other features of the apparatus for heating an electronic module, in accordance with the present invention, include a vacuum head positioned within the nozzle and adapted to provide a negative pressure on a predefined surface of the module. Still other features of the apparatus embodying the present invention include the movable support member disposed within the preheater being formed of a thermally stable polyimide material and the heating element being a thin film heater.

In another aspect of the present invention, a method of removing and replacing an electronic module mounted on a circuit board includes placing the circuit board in a preheater having a heatable support plate adapted to support a selected portion of the circuit board underlying the module and providing a flow of gas through the preheater at a temperature sufficient to heat and maintain solder joints on the module at a temperature of from about 90° C. to about 120° C. The method further includes bringing a nozzle connected with a source of heatable gas into contact with a surface of the board adjacently surrounding the module, providing a flow of gas through the nozzle, and simultaneously heating the support surface supporting the underlying portion of the circuit board. The flow of heated gas through the preheater is continued, and the temperature of the heated gas flowing through the nozzle increased simultaneously with heating the support plate supporting the underlying bottom portion of the board, to a temperature sufficient to heat the solder joints of the module to a predefined solder reflow temperature. The module is then removed from the circuit board, and the contacts on the board and module prepared. A valid module is then positioned on the card. A flow of gas is again introduced into the preheater having a temperature sufficient to heat the module and the board to a temperature of from about 90° C. to about 120° C. The nozzle is then brought into contact with the surface of the circuit board, heated gas reintroduced through the nozzle, and heat applied by the heated support plate in accordance with the above-described heating cycle. After reaching a temperature sufficient to reflow the solder disposed on the interconnection contacts of the module and the circuit board, heating of the gas flowing through the nozzle and the preheater, along with heating of the support surface, are discontinued, allowing the solder at the interconnection sites to solidify. The module and the circuit board are then removed from the preheater.

Other features of the method, embodying the present invention, for removing and replacing an electronic module include removing the module from the circuit board by contact with a vacuum pickup head, and providing a flow of heated nitrogen gas through the preheater and the nozzle.

DETAILED DESCRIPTION OF A PRESENTLY PREFERRED EXEMPLARY EMBODIMENT

Figure 1:
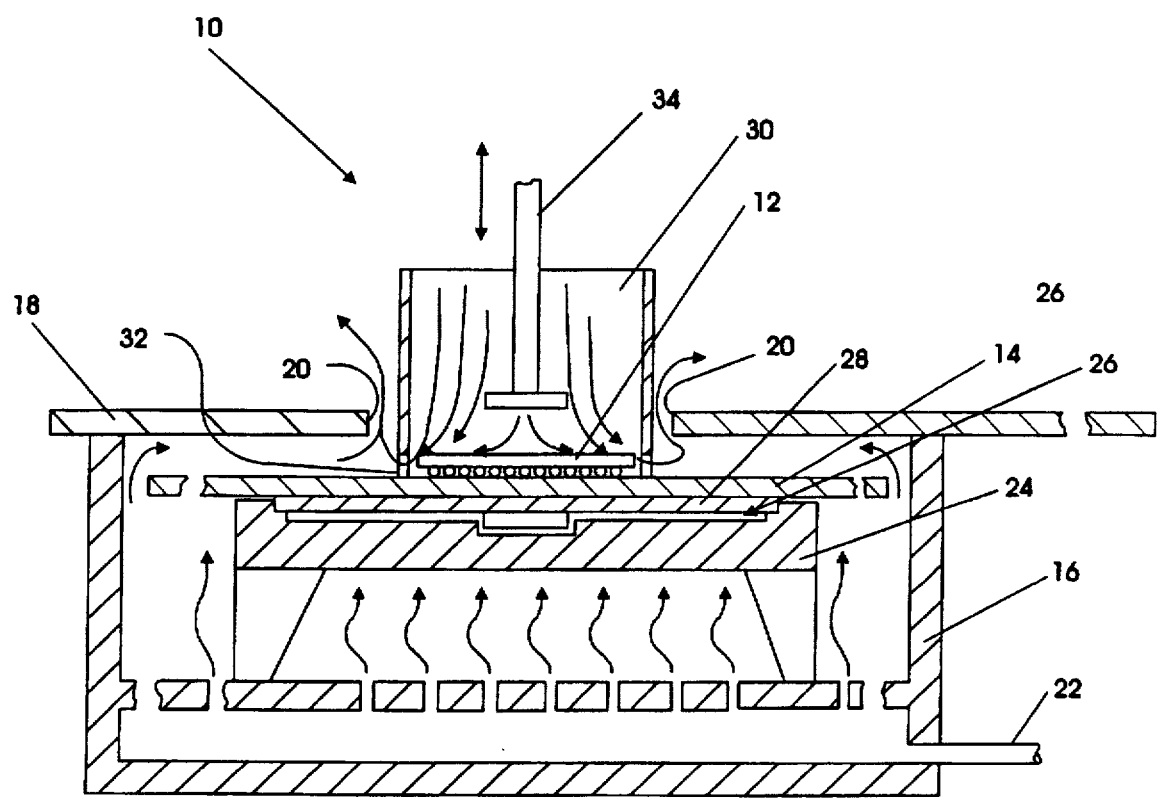
FIG. 1 is a schematic representation of the apparatus, embodying the present invention, for heating an electronic module.

An apparatus embodying the present invention, suitable for use in carrying out the method embodying the present invention, is generally indicated in FIG. 1 by the referenced numeral 10. The apparatus 10 is specifically adapted for heating an electronic module 12 having surface contacts by which the module 12 is mounted to a wiring surface on a card 14, also having a substantially planar bottom surface. The term "module" as used herein, means an electronic component having a plurality of contacts disposed on an active surface that are connected by solder joints to the wiring surface of the card 14. Examples of such modules include Ceramic Ball Grid Array components (CBGA), Ceramic Column Grid Array components (CCGA), Plastic Ball Grid Array components (PBGA), or other Surface Mount Technology components (SMT), and other components attached by Direct Chip Attachment (DCA), and Quad Flap Pack (QFP). All of the aforementioned examples are attached directly to contact sites provided on the card, whereas QFP components have wire leads. The term "card" as used herein includes laminated substrates having a plurality of electrical circuits disposed therein, such as Printed Circuit Boards (PCB), Printed Wiring Boards (PWB), and other planar structures having a wiring surface disposed for accepting one or more modules thereon.

The apparatus 10, embodying the present invention, includes a preheater 16 generally referred to as a Global Card Preheater in that it is sized to heat an entire card 14. The Global Card Preheater 16 has a cover 18 with an opening 20 defined therein. The preheater 16 also includes an inlet port 22 connected with a source of heated gas, preferably nitrogen. A movable support member 24 is disposed within the preheater 16 and has an upper surface that is adapted to receive a heating element 26 and a thermally conductive plate 28. The support member 24 is preferably formed of a thermally stable, polyimide suitable for high temperature applications, i.e., having a surface temperature of at least about 300° C., such as Vespel™, which is available in fabricated shapes from DuPont and has a service temperature above 400° C. The heating element 26 is preferably a thin film heater available from Minco, Minneapolis, Minn., which, in the exemplary embodiment, has a square planar shape measuring 39 mm on each side. If desired, thin film heaters may be customized to provide greater heat input at specific regions, such as at large thermal mass regions of components. However, in the exemplary embodiment, a thin film heater providing uniform heat distribution is adequate for the described embodiment. Also, the temperature of heating element 16 is controlled during the heating cycle by a conventional thermostatic controller 36. The thermal conductive plate 28 is preferably formed of copper which, in the exemplary embodiment, has a thickness of about 0.049 inches (1.2 mm).

Figure 2:
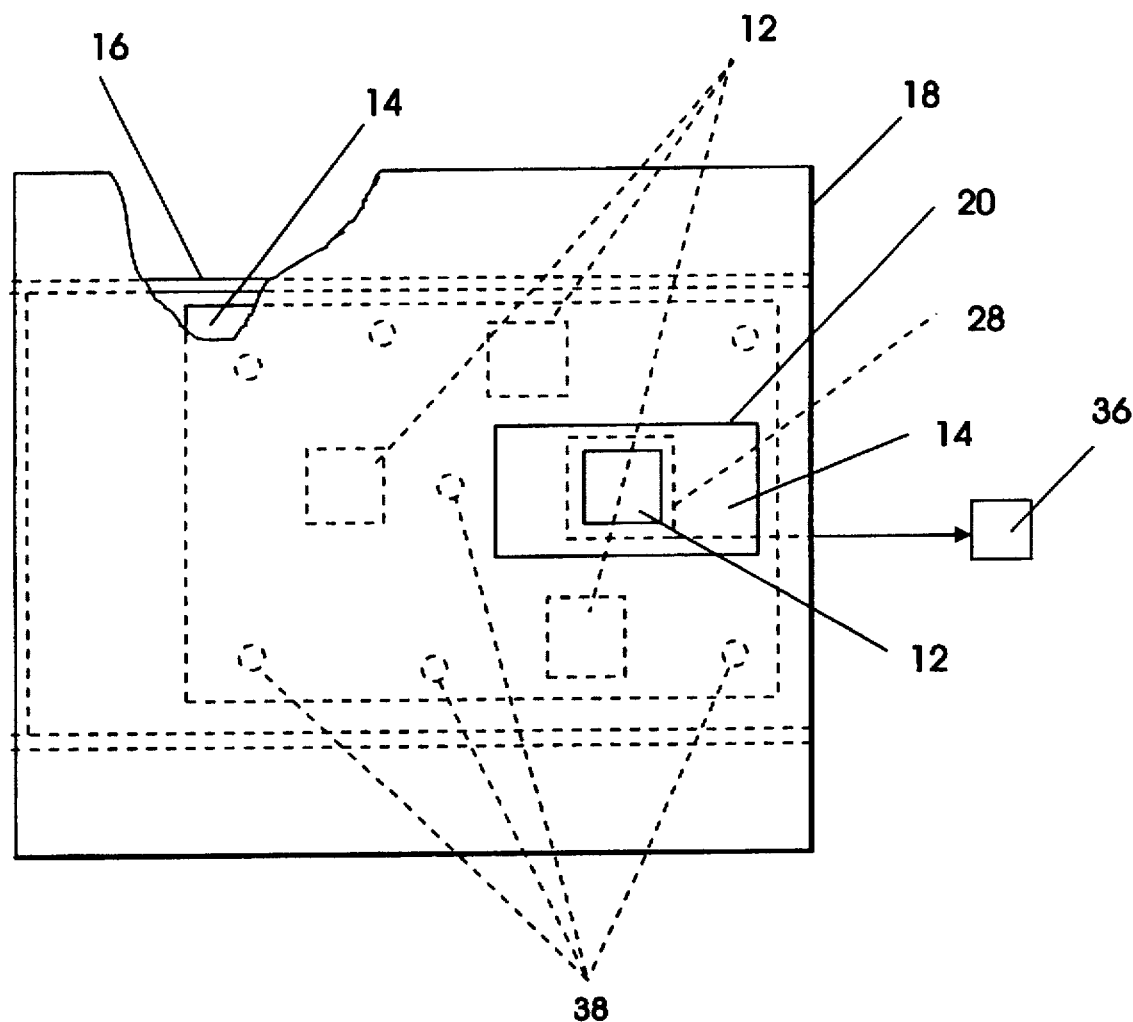
FIG. 2 is a top view of the apparatus, embodying the present invention, with the nozzle removed for clarity.

The preheater cover 18 is adapted to be disposed at a number of selected positions so that the opening 20 may be aligned with a specific module 12 mounted on the card 14. The position of other modules 14 that may be mounted on the card 14 are shown in dashed lines in FIG. 2 and, as can be seen, the cover 18 overhangs the edge of the heater box so that when moved, the opening 18 can be aligned with a specific module, and the cover still rest on the outer edges of the preheater 16. The opening 18 is sized so that it will provide a clearance opening around a nozzle 30 when the nozzle is inserted through the opening. As can be seen in FIG. 1, this provides for a flow of the heated gas from the inlet port 22, through internal baffles disposed within the preheater 16, around the card 14, and thence out through the opening 20. Desirably, a plurality of supports 38 for the card 14 are strategically positioned within the preheater be, as shown by dashed lines in FIG. 2.

The lower end of the nozzle 30 is adapted to surround the perimeter of the module 12 and apply a nominal pressure, e.g. about 1 lb, (4.4N), to assure positive contact of the lower surface of the card 14 with the thermally conductive plate 28 during the heating cycle and control possible warpage of the card 14 during heating. The nozzle 30 is also connected to a source of heated gas, preferably nitrogen, which flows through the nozzle, over the module 12 and surrounding portion of the card 14, and thence through a plurality of ports 32 provided along the lower edge of the nozzle 30, and out of the preheater 16 through the cover opening 20. A vacuum pickup head 34, operably connected to a device such as a pump capable of drawing a vacuum, or negative pressure, is vertically movable within the nozzle 30 from a position spaced from the module 12 to a pickup position whereat the vacuum pickup head 34 is in physical contact with the upper planar surface of the module 12.

Figure 4:
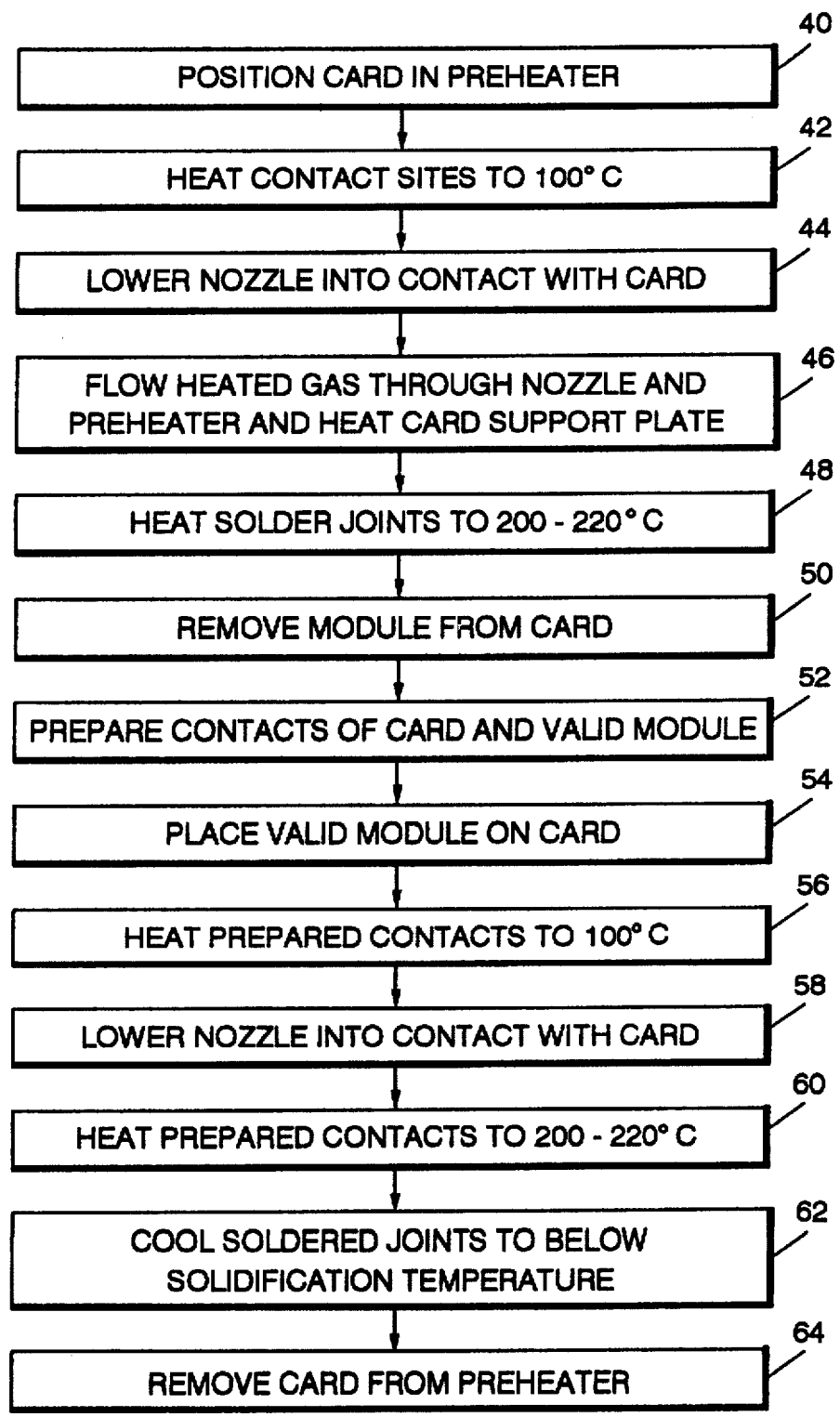
FIG. 4 is flow diagram of the method, embodying the present invention, for removing and replacing a module from a card.

In carrying out the method, embodying the present invention, for removing and replacing an electronic component from a circuit board, or card, the support member 24 is adjustably positioned within the preheater 16 so that it is directly vertically aligned with an identified faulty module 12 or modular connection on the card 14 when the card is placed in the preheater 16. As noted above, the support member 24 has the heating element 26 and the thermally conductive plate 28 disposed on an upper surface of the support member 24. As can be seen in FIG. 1, the conductive plate 28 is spaced a short distance above the support member 24 so that the bottom surface of the plate 28 contacts only the heating element 26. After positioning the support member 24, with the heating element 26 and conductive plate 28 disposed thereon, the card 14 is placed on the plate 28 at the selected position in the preheater 16, as represented by block 40 in FIG. 4.

The cover 18 is then placed on the preheater 16, and a flow of heated gas, preferably nitrogen, is directed through the preheater 16 and continued for a time sufficient to uniformly heat the solder joints joining the module 12 to the card 14 to a temperature of from about 90° C. to about 120° C., as indicated at block 42. In actual practice, the gas flow through the preheater 16 is continuous, i.e., it is always on, and is heated prior to introduction through the inlet port 22 to a temperature somewhat higher than the 90° C. to 120° C. target range for the solder joints, for example, about 145° C. The continuous flow of the controlled temperature gas also aids in avoiding overheating of areas of the card 14 that are spaced away from the faulty module 12. Typically, the solder joints are heated, by the above described gas flow, at a rate of about 2.5° C./s until the joints approach 100° C., whereat the temperature of the heated gas may be controlled to maintain the joints at that temperature for a period of time sufficient to allow thermal equalization of the card 14 and module 12, e.g., about one to two minutes. After stabilizing the components at a temperature in the range of from about 90° C. to about 120° C., the nozzle 30 is lowered into contact with the wiring surface of the card 14, as indicated at block 44. A flow of heated gas, preferably nitrogen, is then directed through the nozzle 30 and simultaneously, the thin film heater 26 is activated to provide heat to the thermally conductive plate 28, and hence to the bottom surface of the portion of the card 14 underlying the module 12, as represented at block The flow of heated gas through the preheater 16, the nozzle 30, and the heating of the conductive plate 28, is continued until the solder joints on the module 12 interconnected with the card 14 all reach a temperature of from about 200° C. to 220° C., a temperature at which the solder is capable of reflowing, i.e., it becomes molten. This portion of the heating cycle is represented by block 48 in the flow diagram shown in FIG. 4. Preferably the rate of heating of the solder joints between 183° C. and 200° C. is controlled at a rate from about 0.4° C. to 1.5° C./s. It is necessary that the solder joints reach a temperature at which the joint can be separated, i.e., its transition or reflow temperature, typically about 200° C., and not exceed a temperature above 220° C. whereat the solder becomes so liquid that its flow is not controllable, thus adversely affecting the rework operation.

When the solder joints between the module 12 and card 14 reach the reflow temperature, the vacuum pickup head 34 is lowered into contact with an upper planar surface of the module 12, a vacuum applied, and the module 12 lifted away from the card 14, as represented by block 50. The site of the module on the card 14, and the contacts of a validated module 12 are then prepared, for example, by coating the contacts of the validated module with a eutectic solder paste and removing old solder from the substrate contacts, as indicated at block 52.

The vacuum pickup head 34 then picks up the validated module 12 and places it on the card site so that the respective contacts of the modular 12 and the card 14 are aligned, as indicated at block 54.

The continuous flow of hot gas through the preheater 16 is maintained, as described above, until the contacts on the card 14 and the modular 12 are stabilized at a temperature of from about 90° C. to about 120° C., as shown at block 56. The nozzle 30 is then lowered into contact with the card 14 as shown at block 58, and the flow of heated gas through the preheater 16, the nozzle 30, and heating of the conductive plate 28, are carried out in the manner described above, until the prepared contacts of the card 14 and module 12 reach a temperature from about 200° C. to 220° C., as indicated at block 60. At this point, the heating cycle is discontinued, and the solder joints allowed to cool, as indicated at block 62, to below a temperature sufficient to solidify the solder joints. At this point the remove and replace process is complete, and the connected module 12 and card 14 are removed from the preheater 16, as indicated at block 64.

Figure 3:
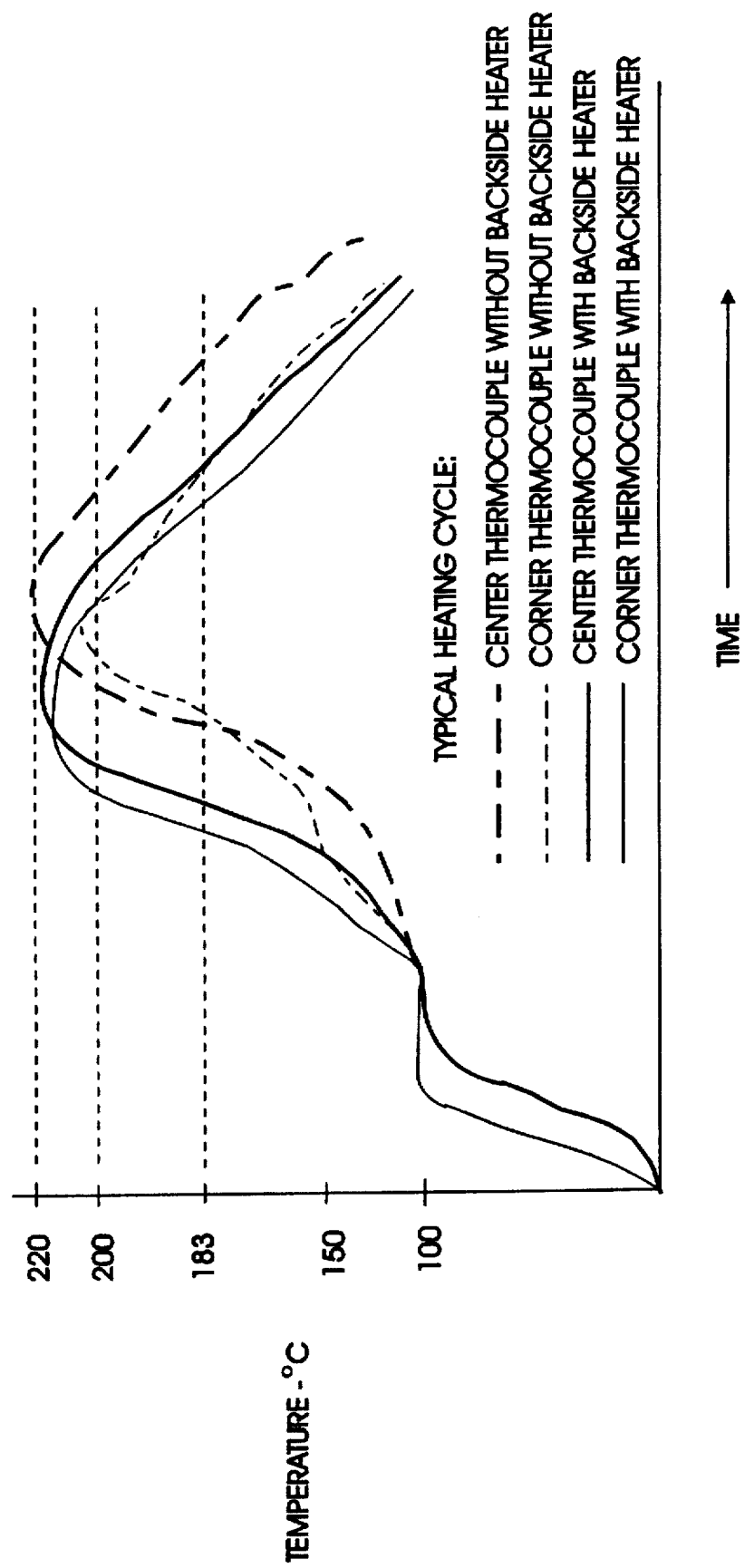
FIG. 3 is a graph showing the temperature distribution during heating between thermocouples located at the center and at one corner of a module, the respective thermocouple temperatures during a representative prior art heating cycle is compared with the heating cycle embodying the present invention.

As discussed above, a serious problem in removing and replacing modules heretofore has been the difficulty of bringing all of the solder joints interconnecting the module to the card to a uniform temperature whereat the joints are simultaneously heated to a temperature enabling separation of the module from the card. To illustrate this problem, a conventional 44 mm square module was drilled at the center and at one corner and a thermocouple inserted at each of those sites. The instrumented module, mounted on a card, was then placed in the preheater 16 without the thin film heating element 26, the support member 24, or the thermally conductive plate 28. A typical heating cycle, representative of the cycle provided by the prior art apparatus, is shown in FIG. 3 by broken lines. The center electrode on the test module is shown as a dark broken line, whereas the corner thermocouple in the test module is shown as a thin broken line.

In the second part of the test, the thin film heating element 26 and conductive plate 28 were placed on the support member 24, the card carrying the instrumented test module positioned on the conductive plate 28, as shown in FIG. 1, and the heating cycle carried out in accordance with the above-described method embodying the present invention. That test is shown in solid lines, with the center electrode being the dark solid line and the corner electrode being the thin solid line. It can be seen that the initial preheating cycle, i.e., the rise in temperature from ambient to about 100° C., is the same in both tests. However, the temperature from the preheat, or thermal stabilization point of about 100° C. to the desired solder joint temperature range of about 200° C.–220° C. is much quicker and more uniform, i.e., the separation between the center and corner thermocouples is much less, and are substantially equal in the desired 200° C.–220° C. range. Another important consideration is that the time that the joints are maintained at a temperature above 183° C. should not exceed 145 seconds. It can be seen that as a result of the faster heating rate provided by the method embodying the present invention, that the time above 183° C. is significantly reduced from that of the representative prior art heating cycle.

Thus, it can be seen that the apparatus, embodying the present invention, and the method for removing and replacing an electronic module, embodying the present invention, provide a significantly improved heating cycle over that attainable by the prior art structures and methods. Importantly, the temperature distribution across the module is much closer during heating, providing a significant reduction in the difference, or spread, in temperature at the maximum temperature achieved in the cycle. Also, the time above 183° C. is significantly reduced, and the heating rate from the preheat temperature to the maximum temperature is much faster. All of these significant advantages result in a heating cycle time that is decreased by at least 25%. This improvement is particularly advantageous for larger CBGA/CCGA/PBGA packages, i.e., packages having a size of 25 mm or larger, and high thermal mass cards or modules. These improvements are significant in rework operations supporting high volume manufacturing.

Although the present invention is described in terms of a preferred exemplary embodiment, those skilled in the art will recognize that changes may be made in the specific construction of the preheater 16 and in other structures, which are shown in schematic form only, may be made without departing from the spirit of the invention. Such changes are intended to fall within the scope of the following claims. Other aspects, features, and advantages of the present invention can be obtained from a study of this disclosure and drawings, along with the appended claims.

What is claimed is:

1. An apparatus for heating an electronic module having surface contacts by which said module is attached to a wiring surface of a card having a substantially planar bottom surface, comprising:

a preheater having a cover with an opening defined therein and an inlet port connectable with a source of heated gas;

a movable support member disposed within said preheater;

a heating element disposed on said support member;

a thermally conductive plate disposed on said heating element in thermally conductive relationship therewith, and adapted to support a selected portion of said bottom surface of the card in thermally conductive communication with said portion of the bottom surface of the card; and a nozzle connectable with a source of heated gas and adapted to contact the wiring surface of said circuit board at a defined position whereat said nozzle provides enclosure over and around said module mounted on said card.

2. An apparatus, as set forth in claim 1, wherein said apparatus includes a vacuum head positioned within said nozzle and adapted to provide a negative pressure on a predefined surface of said module.

3. An apparatus, as set forth in claim 1, wherein said movable support member is formed of a thermally stable polyimide material having a service temperature of at least about 300° C.

4. An apparatus, as set forth in claim 1, wherein said heating element is a thin film heater.

5. An apparatus, as set forth in claim 1, wherein said thermally conductive plate is formed of copper and has a thickness of about 0.049 in. (1.2 mm).

6. An apparatus, a set forth in claim 1, wherein said cover of the preheater is movably positioned on said preheater whereby said opening in the cover may be selectively positioned with respect to said preheater.

7. A method for removing and replacing an electronic module mounted on a card and connected thereto at a plurality of electrical contact sites, comprising:

placing said card in a preheater having a heatable support surface adapted to support a selected portion of said card underlying said module;

providing a flow of a heated gas through said preheater and maintaining said flow for a time sufficient to uniformly heat said contact sites to a temperature of from about 90° C. to about 120° C.;

bringing a nozzle connected to a source of heated gas into contact with a surface of said card adjacently surrounding said module mounted on said card;

providing a flow of heated gas through said nozzle and through said preheater and simultaneously heating said support surface;

maintaining the flow of heated gas through said preheater and through said nozzle and the heating said support surface, for a time sufficient to heat said contact sites to a predefined solder reflow temperature;

removing said module from said card;

preparing said contact sites on said module and said card for reconnection;

providing a flow of a heated gas through said preheater and maintaining said flow for a time sufficient to heat said contact sites of said module and said card to a temperature of from about 90° C. to about 100° C.;

positioning an operable module on said card in aligned relationship with respect to said contact sites on said card;

bringing a nozzle connected to a source of heatable gas into contact with a surface of said card adjacently surrounding said operable module positioned on said card;

providing a flow of heated gas through said nozzle and said preheater, and simultaneously heating said support surface;

maintaining the flow of heated gas through said preheater and through said nozzle and the heating of said support surface, for a time sufficient to heat said contact sites to a predefined solder reflow temperature;

discontinuing the heating of said gas flowing through the nozzle, said preheater, and discontinuing heating of said support plate, whereby the temperature of said contact sites is reduced to a predetermined temperature at which the solder at said contact sites is in a solid state;

removing said validated module and card from said preheater.

8. A method for removing and replacing an electrical module, as set forth in claim 7, wherein removing said module from said card includes contacting said module with a vacuum pickup head subsequent to heating said contact sites to said predetermined temperature at which the solder at said contact sites is at a predefined reflow temperature.

9. A method for removing and replacing an electronic module, as set forth in claim 7, wherein said providing a flow of heated gas through said preheater includes providing a flow of heated nitrogen gas.

10. A method for removing and replacing an electronic module, as set forth in claim 7, wherein said providing a flow of heated gas through said nozzle includes providing a flow of heated nitrogen gas.

11. A method for removing and replacing an electronic module, as set forth in claim 7, wherein said temperature sufficient to heat said contact sites to a predefined solder reflow temperature is from about 200° C. to about 220° C.

12. A method for removing and replacing an electronic module, as set forth in claim 7, wherein said bringing a nozzle into contact with a surface of said card includes contacting said card with a force sufficient to maintain the bottom surface of said card in intimate heat conducting contact with said heatable support surface.

* * * * *